INVENTOR.
FORREST A. NELSON
BY
ATTORNEY

United States Patent Office 3,496,454
Patented Feb. 17, 1970

3,496,454
FREQUENCY TRACKING MAGNETIC FIELD REGULATOR EMPLOYING MEANS FOR ABRUPTLY SHIFTING THE REGULATED FIELD INTENSITY
Forrest A. Nelson, Palo Alto, Calif., assignor to Varian Associates, Palo Alto, Calif., a corporation of California
Filed May 19, 1967, Ser. No. 639,783
Int. Cl. H01h 47/00; G01r 33/08
U.S. Cl. 324—.5
7 Claims

ABSTRACT OF THE DISCLOSURE

A frequency tracking magnetic field regulator is disclosed as employed to provide the regulated intense magnetic field for a gyromagnetic resonance spectrometer. The magnetic field regulator is characterized by providing a magnetic field which tracks a variable reference frequency via the intermediary of a closed loop control channel. The control channel is locked to a selected gyromagnetic resonance line. The resonance line serves as an extremely narrow band error detector for detecting slight departures in the magnetic field intensity from some predetermined field intensity corresponding to the reference frequency applied to excite the resonance line. In order for the regulator to follow sudden substantial jumps in the reference frequency without loss of resonance of the control resonance line, a special circuit is provided. The special circuit includes a frequency converter which converts the sudden jump in the reference frequency into a change in intensity of an electrical signal. A differentiator differentiates the change in intensity of the electrical signal to give an output proportional to the time rate of change in the reference frequency. The time rate of change signal is fed to an integrator which integrates same and shifts the magnetic field to a new intensity which is sufficiently close to that value to be determined by the new reference frequency such that the control channel will phase lock onto the control resonance line and precisely control the field at this new value as determined by the new reference frequency. In one embodiment of the regulator of the present invention, a moving-coil reflecting-mirror galvanometer of a conventional magnetic field flux stabilizer circuit serves as the integrator.

DESCRIPTION OF THE PRIOR ART

Heretofore, frequency controlled magnetic field regulators have been employed. In such devices, an extremely precise control over the magnetic field intensity is obtained by means of a sharply resonant gyromagnetic resonance line. However, in such prior art devices, it was found difficult to change magnetic field intensity abruptly from one value to a substantially different value without loss of lock on the control gyromagnetic resonance line due to the inability of the control channel to change the field intensity rapidly enough to retain lock on the resonance line. Once phase lock was lost, the magnetic field would reach some value not at the value to produce resonance of the control group at the new reference frequency. As a consequence much time was lost in manually adjusting the magnetic field intensity until resonance of and lock on the control group could be reestablished.

SUMMARY OF THE PRESENT INVENTION

The principal object of the present invention is the provision of an improved frequency controlled magnetic field regulator.

One feature of the present invention is the provision, in a frequency controlled gyromagnetic resonance phase locked field regulator, of means for shifting the magnetic field to a new value, in accordance with a shift in the reference frequency, which is sufficiently close to the correct field intensity for the new reference frequency that the phase locked control channel will lock onto gyromagnetic resonance of the control resonance line at the new reference frequency, whereby sudden substantial shifts in field intensity are obtained without loss of magnetic field regulation.

Another feature of the present invention is the same as the preceding feature wherein the means for shifting the magnetic field to the new value includes means for deriving an electrical signal of a magnitude which changes in accordance with the change in reference frequency and employing this signal in a circuit to shift the magnetic field to the new value.

Another feature of the present invention is the same as the preceding feature including a differentiator operable upon the derived electrical signal to produce a signal determinative of the time rate of change in the reference frequency and integrator means operable upon the time rate of change signal to produce an output which is employed to change the magnetic field intensity to the new value as determined by the new reference frequency.

Another feature of the present invention is the same as the preceding feature wherein the integrator is provided by an integrating moving-coil reflecting-mirror galvanometer which produces an output employed to energize a winding to produce a magnetic field in the region of magnetic field being regulated.

Other features and advantages of the present invention will become apparent upon a perusal of the following specification taken in connection with the accompanying drawings wherein:

DESCRIPTION OF THE PREFERRED EMBODIMENTS

Figure 1:
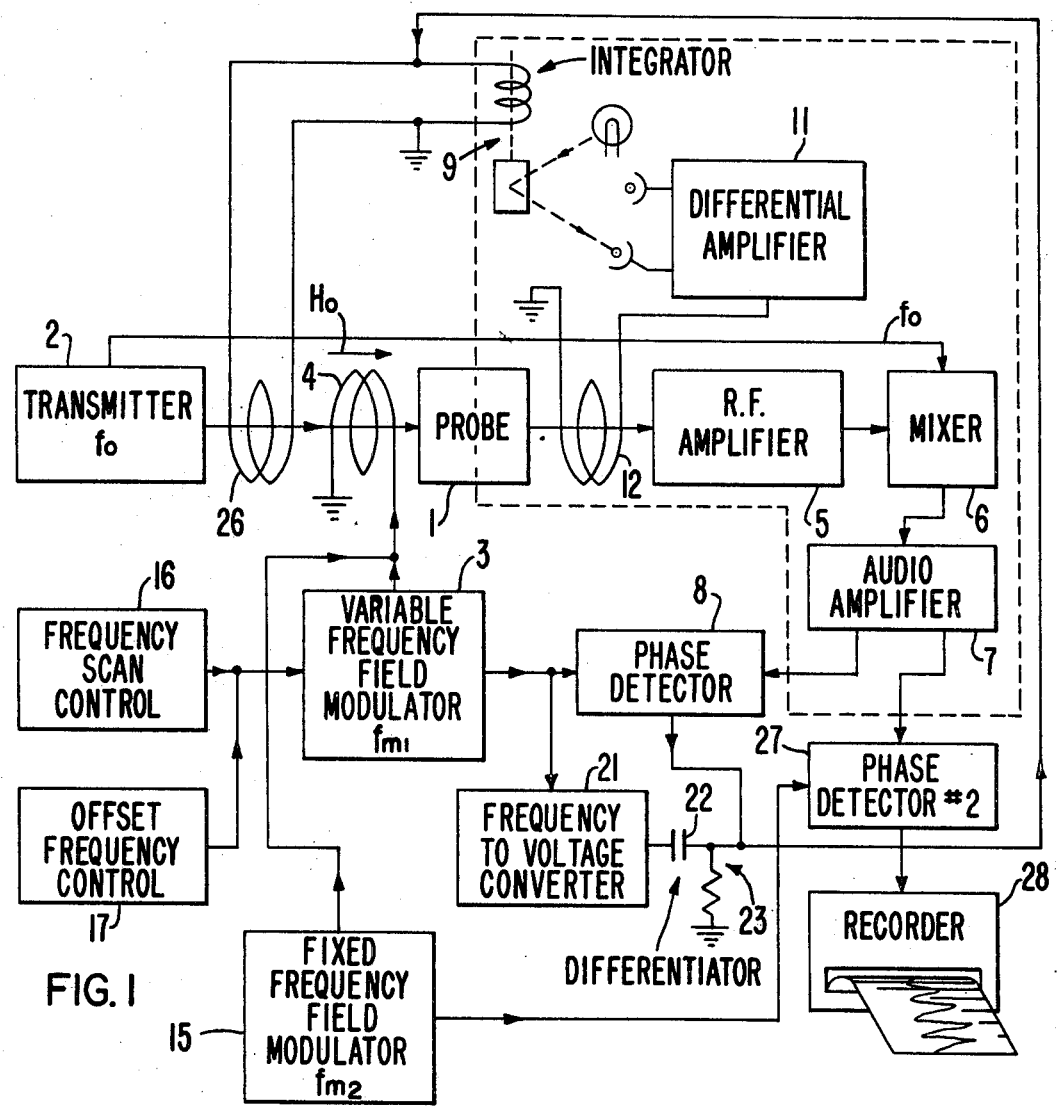
FIG. 1 is a schematic block diagram of a gyromagnetic resonance spectrometer and magnetic field regulator employing features of the present invention.

Referring now to FIG. 1, there is shown a gyromagnetic resonance spectrometer and magnetic field regulator incorporating features of the present invention. More particularly, a magnet, not shown, produces a magnetic field $H_0$, as of 14 kg., which is to be regulated and which is to be used as the polarizing field of a gyromagnetic resonance spectrometer.

A gyromagnetic resonance probe structure 1 is disposed in the magnetic field $H_0$. The probe 1 contains a control sample of gyromagnetic resonance matter such as tetramethylsilane (TMS). A radio freqnency (RF) transmitter 2 at a frequency $f_0$ which is near to the predetermined resonance frequency of the control sample at the approximate magnetic field intensity $H_0$ to be used (see FIG. 2) supplies an RF signal to the probe 1. The RF signal produces an RF magnetic field within the control sample at right angles to the polarizing magnetic field $H_0$.

A variable frequency field modulator 3 modulates the polarizing magnetic field $H_0$ via coil 4 with an audio frequency signal at a frequency, $f_{m1}^0$, as of 5 kHz., which is variable about 5 kHz. and when added to the frequency of the RF transmitter $f_0$ is at the resonance frequency of the control sample in the magnetic field $H_0$. This excites resonance of the TMS control sample. Resonance of the TMS control sample, at the TMS resonance frequency $f_1$, is picked up by the probe 1 and fed to an RF amplifier 5 wherein it is amplified and fed to one input of a mixer 6. A reference signal from the transmitter at $f_0$ is fed to the other input of the mixer 6.

The output of the mixer is a TMS resonance signal at the field modulation frequency of $f_{m1}^0$. This signal is amplified by audio amplifier 7 and one output is fed to a phase sensitive detector 8 wherein it is phase compared with a reference signal derived from the field modulator 3. The phases of the input signals are adjusted such that the output of the phase sensitive detector 8 is a DC error signal with a phase and magnitude determinative of the departure of the magnetic field $H_0$ from that precise value to produce resonance of the control sample at the reference frequency $f_1$ of $f_0 + f_{m1}^0$.

The output error signal from the phase sensitive detector 8 is fed to the input of a moving-coil reflecting mirror-galvanometer 9. The output of the galvanometer is fed to a differential amplifier 11 which feeds a winding 12 to produce a magnetic field component which is superimposed upon the DC magnetic field to bring the total DC field to the precise value to sustain resonance of the control sample (TMS).

Figure 2:
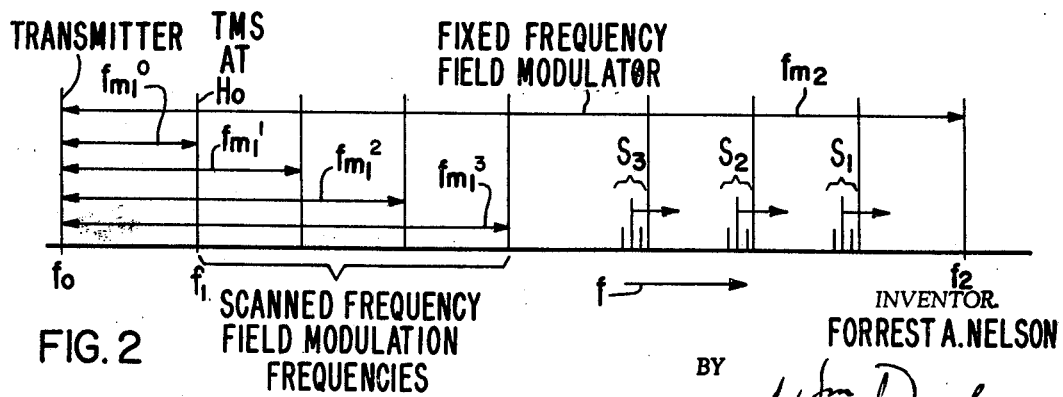
FIG. 2 is a resonance spectrum diagram depicting the operation of the magnetic field regulator and spectrometer of FIG. 1.

The gyromagnetic resonance spectrometer portion of the apparatus includes a sample of gyromagnetic resonance matter under analysis which is also located within the probe 1. It will be assumed, for the sake of explanation, that the sample under analysis has three resonance spectrum portions $S_1$, $S_2$, and $S_3$ as indicated in FIG. 2. A fixed frequency field modulator 15 at a convenient audio frequency $f_{m2}$, as of 10 kHz., feeds its output to the field modulation coils 4 for producing a second sum frequency at $f_2$ which is equal to $f_0 + f_{m2}$.

The magnetic field intensity $H_0$, as predetermined by the reference frequency of $f_0 + f_{m1}^0$, is too low to bring any part of the resonance spectrum $S_1$, $S_2$, and $S_3$ of the sample under analysis into resonance at $f_2$, namely $f_0 + f_{m2}$. A frequency scan control 16 is provided to scan the reference frequency $f_{m1}$ of the variable frequency field modulator 3 over a relatively small band of frequencies, as of ±500 Hz./min. at a relatively slow rate, as of 30 Hz./min. This will produce a scan of the regulated magnetic field $H_0$ at the slow rate which will in turn cause the resonance spectrum to be scanned by the fixed analysis frequency $f_2$, provided, the resonance spectrum is within the scanning range of the scan control 16 which is not the case for the assumed initial conditions illustrated in FIG. 2.

Therefore, an offset frequency control 17 is provided which shifts the reference frequency $f_{m1}$ of the variable frequency field modulator 3 to one of several frequencies $f_{m1}^1$, $f_{m1}^2$, $f_{m1}^3$, . . . etc., spaced at certain predetermined frequencies corresponding to certain predetermined magnetic field intensities across the operating range of the spectrometer. The scanning frequency range is sufficient to scan the frequency difference between adjacent offset frequencies.

For the particular case illustrated in FIG. 2, the spectrum portion $S_1$ is brought within the scanning range of the spectrometer by switching the offset frequency control 17 to a position which causes the variable frequency modulator 3 to jump from a first frequency $f_{m1}^0$ to a second frequency $f_{m1}^1$, thereby increasing the regulated magnetic field $H_0$ to an intensity which will move the spectrum $S_1$ within the field scanning range of the fixed analysis frequency $f_2$. Likewise, frequency jumps of the variable frequency field modulator 3 to frequencies $f_{m1}^2$ and $f_{m1}^3$ will bring spectrum portions $S_2$ and $S_3$, respectively, within the field scanning range of the fixed analysis frequency $f_2$.

However, the resonance locked control channel does not have a sufficiently wide field capture range to follow a sudden jump in the reference frequency as produced by the offset frequency control 17. Therefore, a special circuit is provided to derive a signal from the jump in reference frequency which is proportional to the amount of the frequency change. This signal is fed to a winding in the regulated field $H_0$ to change the magnetic field intensity to a new intensity approximately at the intensity as predetermined by the new reference frequency. This new field intensity is sufficiently close to the correct intensity, as determined by the new reference frequency, so that the phase locked control channel will be able to lock onto resonance of the control sample and make such minor corrections on the field intensity as are required to bring the magnetic field to the new value precisely.

The special circuit includes a frequency to voltage converter 21 connected to the output of the variable frequency field modulator 3. The converter 21 produces an output electrical signal which is proportional to the frequency of the field modulator 3. Thus, when the modulator frequency is offset the output of the converter 21 is similarly offset by a proportionate amount. A differentiator, comprising capacitor 22 and resistor 23 differentiates the converter's output signal to obtain a signal proportional to the time rate of change of the reference frequency. The time rate of change signal is fed to the input of the moving-coil reflecting mirror galvanometer 9 which integrates the signal. The integrated signal is amplified by differential amplifier 11 and thence fed to the buckout coil 12 of the flux stabilizer for changing the magnetic field $H_0$ to approximately the new value as predetermined by the new reference frequency.

The flux stabilizer is more fully described in U.S. Patent 2,930,966 issued Mar. 29, 1960 and assigned to the same assignee as the present invention. Briefly, the flux stabilizer includes an input coil 26 coupled to the field $H_0$ to be stabilized.

A change in the field $H_0$ induces a signal in the pickup coil 26 which is integrated by the moving-coil reflecting mirror-galvanometer 9, fed to the differential amplifier 11, and thence to the buckout coil 12 for bucking out any changes in the magnetic field, thereby stabilizing the field $H_0$.

The spectrometer picks up the excited resonance signal of the spectrum $S_1$, $S_2$, and $S_3$ under analysis by the same receiving structure in the probe 1 as used to pick up resonance of the control sample. The resonance signal is amplified by RF amplifier 5 and mixed with the transmitter signal $f_0$ in mixer 6 to produce the audio resonance signal at the fixed field modulation frequency of $f_{m2}$. This signal is fed to audio amplifier 7 and thence to a second phase sensitive detector 27 wherein it is phase detected against a reference from the fixed field modulation frequency $f_{m2}$ to produce an absorption mode DC resonance signal. The resonance signal is fed to recorder 28 and recorded versus time or versus the frequency scan to obtain a spectrum of the sample under analysis.

What is claimed is:

1. In a frequency controlled magnetic field regulator, means for supplying a variable frequency reference signal which is to determine the intensity to which a magnetic field is to be regulated, means including a gyromagnetic resonance sample for comparing the intensity of the magnetic field to be regulated with the reference frequency to derive an error signal determinate of the departure of the magnetic field intensity from the intensity as determined by the reference frequency, means responsive to the error signal for correcting the magnetic field intensity, means for shifting the reference frequency from a first frequency to a second frequency to shift the magnetic field from a first intensity to a second intensity, the improvement comprising, means in addition to said gyromagnetic resonance comparing means for deriving a second error signal having an amplitude proportional to the shift in reference frequency, means responsive to the second error signal to shift the magnetic field intensity from the first intensity to a second intensity which is approximately at the precise second field intensity as predetermined by said second reference frequency such that said comparing and correcting means will make such relatively minor corrections to the approximate second magnetic field intensity as are necessary to obtain precisely that field intensity as predetermined by said second reference frequency.

2. The apparatus of claim 1 wherein said magnetic field to frequency comparing means includes means for applying the reference frequency to the sample of gyromagnetic resonance matter disposed in the magnetic field to be regulated to excite resonance of the gyromagnetic resonance sample, means for detecting gyromagnetic resonance of the sample of matter, and means for comparing the detected resonance with the applied frequency to derive the first error signal.

3. The apparatus of claim 2 wherein said means for comparing the detected resonance with the applied frequency includes a phase sensitive detector for comparing the reference frequency with a resonance signal derived from the sample of matter to produce a phase sensitive first error signal.

4. The apparatus of claim 1 wherein said means for deriving a signal having an amplitude proportional to the shift in reference frequency includes a differentiator responsive to the shift in reference frequency to produce a signal determinative of the time rate of change in the reference frequency, and an integrator operable upon the output of said differentiator to produce the second error signal which is fed to said second error signal responsive means to shift the magnetic field intensity from the first field intensity to approximately the second field intensity.

5. The apparatus of claim 4 wherein said integrator is a moving-coil reflecting mirror-galvanometer.

6. The apparatus of claim 1 wherein said means for deriving a signal proportional to the shift in reference frequency includes a frequency converter which samples the reference frequency to produce an output signal and which converts the shift in reference frequency to a shift in the output signal level of said converter.

7. The apparatus of claim 5 including a magnetic field flux stabilizer having a pickup winding and a buckout winding coupled to the magnetic field to be regulated, and said moving-coil reflecting mirror galvanometer having its input connected to said pickup winding of said flux stabilizer and its output connected to said buckout winding, whereby said flux stabilizer serves the dual function of stabilizing the flux of the magnetic field being regulated and of stepping the magnetic field to the approximate second field intensity by feeding the second error signal to said buckout winding.

References Cited

UNITED STATES PATENTS

| 2,930,966 | 3/1960 | Bell | 324—0.5 |
| 2,979,641 | 4/1961 | Gunthard | 317—123 |
| 3,034,040 | 5/1962 | Williams | 324—0.5 |
| 3,394,288 | 7/1968 | Dadok | 317—123 |

FOREIGN PATENTS 908,750    10/1962    Great Britain.

WILLIAM F. LINDQUIST, Primary Examiner

MICHAEL J. LYNCH, Assistant Examiner

U.S. Cl. X.R.

317—123